April 18, 1961 H. GANG 2,980,323

QUOTIENT REGISTRATION MEANS FOR CALCULATING MACHINES

Filed June 14, 1956 2 Sheets-Sheet 1

INVENTOR
HERMAN GANG
BY
Norman Friedman
ATTORNEY

April 18, 1961 H. GANG 2,980,323

QUOTIENT REGISTRATION MEANS FOR CALCULATING MACHINES

Filed June 14, 1956 2 Sheets-Sheet 2

INVENTOR
HERMAN GANG
BY Norman Friedman
ATTORNEY 2,980,323

QUOTIENT REGISTRATION MEANS FOR CALCULATING MACHINES

Herman Gang, Morris Plains, N.J., assignor to Monroe Calculating Machine Company, Orange, N.J., a corporation of Delaware Filed June 14, 1956, Ser. No. 591,369

2 Claims. (Cl. 235—79)

This invention relates to calculating machines which perform division and multiplication operations, and in which the multiplication mechanism includes a multiplier storage means.

It is an object of the present invention to provide for entry of a quotient automatically into the multiplier storage means as the quotient is being computed.

It is often desirable to perform a division operation and immediately thereafter employ the quotient as a multiplier in a multiplication program. To perform these operations sequentially in prior art machines it is necessary, after having obtained the quotient, to manually set the quotient on the keyboard and then operate a suitable key to insert the quotient value into the multiplier storage means, after which multiplication is carried out in the normal manner. These steps present an opportunity for human error since the operator can set an erroneous quotient value on the keyboard, and are time-consuming.

The present invention avoids these disadvantages by providing selectively operable mechanism which, when set prior to carrying out a division program, automatically enters the quotient into the multiplier storage mechanism without further intervention of the operator. Such mechanism includes a normally disabled counting finger which, when enabled, functions to count the quotient into the multiplier storage mechanism.

Further, as applied to a machine which performs division by the subtract, add, shift method in which the machine cycles twice more in each order than the numerical value of the quotient digit, the quotient entry mechanism is so arranged that the counting finger counts into the multiplier storage means a value two less than the total number of cycles employed in computing each quotient digit.

It is therefore a further object of the invention to provide means for automatic entry of a quotient into multiplier storage mechanism, said quotient entry means being arranged to automatically compensate for cycling of the machine in each order in excess of the value of each quotient digit.

In the present disclosure, this automatic compensation is brought about by enabling the quotient entry counting finger only after the machine has cycled twice in computing a quotient digit. Accordingly, the finger will count into the multiplier storage mechanism the correct value of a quotient digit, i.e., a value two less than the number of the cycles completed by the machine in obtaining the digit.

In the present case, the invention is disclosed as embodied in a calculating machine of the nature of that set forth in United States Patents Nos. 2,531,206 and 2,531,207 issued November 21, 1950, to Herman Gang.

Figures 1, 2:
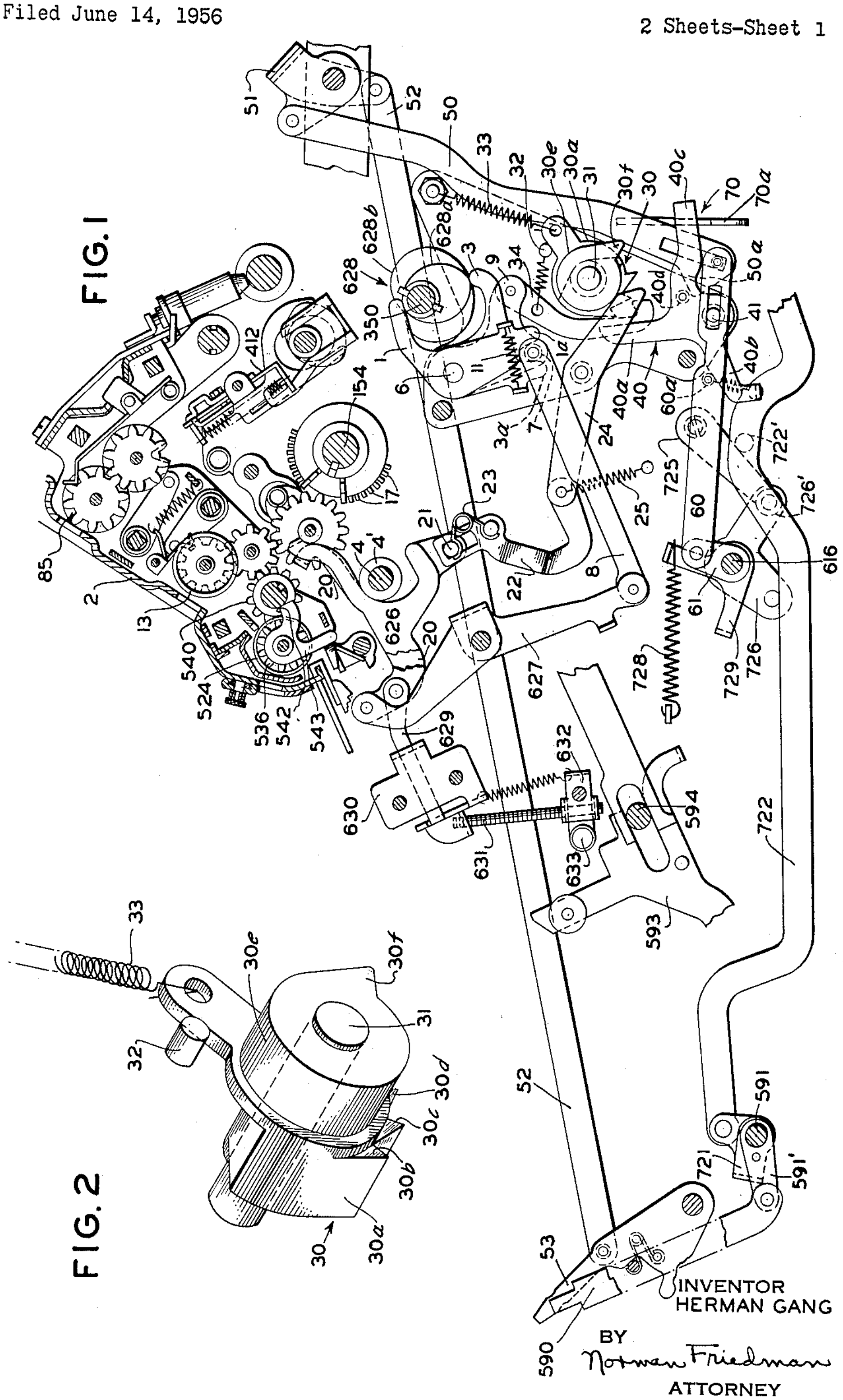
Fig. 1 is a left side elevation of a calculating machine including the quotient entering mechanism.
Fig. 2 is a perspective view showing the member which controls enablement of the quotient entering counting finger.

Referring to Fig. 1, it will be seen that the machine includes a conventional transversely shiftable carriage 2. Mounted in the carriage are a product-dividend register comprising numeral wheels 13, quotient wheels 85, and multiplier storage wheels 524.

Amounts are registered upon the numeral wheels 13 either additively or subtractively according to the direction of rotation of the actuator shaft 4 and the shaft 154 upon which the tens carry members 17 are mounted.

Registration is effected in quotient dials 85 by reversibly operable counting fingers 412, one of which is shown in Fig. 1. These fingers are operated substantially as set forth in Patent No. 2,273,237 to Edward C. Walters.

*Division*

Each quotient digit is computed by the subtract, add, shift method in which the machine cycles twice more than the value of said digit. These two excess cycles comprise an overdraft cycle in which the divisor is subtracted once more than it is contained in the corresponding portion of the dividend, and a single positive registration cycle to correct the overdraft. Upon completion of the corrective positive registration, a one-order shift to the left occurs and the sequence of operations is repeated for computation of the quotient digit of the next lower order The quotient digits are registered in quotient dials 85, the subtract, add, shift sequence causing each quotient dial employed to first register a value one digit higher than the actual quotient value when the overdraft occurs, which is reduced to the correct value by the corrective positive registration.

As set forth in detail in Patent No. 2,531,207, a program of division is initiated by depression of a key 590 (Fig. 1) attached at its lower end to a crank 591' which is attached to the right end of a bail 721 pivotally mounted on a shaft 591. Bail 721 extends to the left of the left-hand side frame of the machine and is there provided with an upstanding arm to which is attached the forward end of a link 722. It will readily be seen that depression of key 590 from its normal position shown in Fig. 1 will cause counterclockwise rotation of crank 591' and bail 721, thus moving link 722 toward the front of the machine.

Link 722 is provided with a pin 722' which is adapted for operation in connection with a latch 725 pivotally mounted on the machine framing. Latch 725 is normally in engagement with a roller 726' provided on an arm of a crank 726, crank 726 being fixed on a shaft 616 which is pivotally mounted in the machine framing and extends across the machine. Shaft 616 is biased counterclockwise by a spring 728 attached to an upstanding arm of another crank 729 fast on said shaft.

When latch 725 is in normal engagement with the roller 726' of crank 726, shaft 616 is held in clockwise position against the tension of spring 728. Latch 725 is normally in contact with pin 722' of link 722 and therefore when link 722 is moved forwardly, pin 722' will move latch 725 clockwise out of engagement with roller 726' of crank 726. Accordingly, spring 728 will rock crank 729, shaft 616, and crank 726 counterclockwise. The above-described rocking of shaft 616 will, as set forth in Patent No. 2,531,207, condition other parts, not disclosed in the present case since they are not necessary for an understanding of the present invention, to permit the division program to be carried out.

The division computation is initiated with carriage 2 in its extreme right-hand position. During the calculation, the carriage shifts leftwardly from order to order for computation of successive lower order digits of the quotient.

*Multiplication*

A multiplier value is set in multiplier storage dials 524 provided with gears 536 fast thereto, and associated multiplier storage gears 540 by first setting the multiplier on the keyboard and thereafter operating a suitable set-up key. The mechanism whereby the multiplier is transferred from the keyboard to storage dials 524 and storage gears 540 is disclosed in detail in the aforementioned Patent No. 2,531,206. A normally ineffective multiplier counting finger 626 is adapted to be enabled for co-operation with successive ones of said storage gears 540 to count out the multiplier set in said gears as follows.

A slide 593 is supported at its rearward end upon a pin 594 fixed in the machine framing. A multiplier key (not shown) is suitably coupled to slide 593 so that depression of said key to initiate a program of multiplication will cause slide 593 to be moved rearwardly to enable counting finger 626. Counting finger 626 is driven by a rocker comprising two follower arms 1 and 3 independently pivotally mounted on a single fixed pin 6. Each of said arms is formed with a depending ear 1*a*, 3*a*, the two ears being disposed on opposite sides of and in straddling relation with a stud 7. Stud 7 pivotally couples the rear end of a link 8 to the lower portion of a crank 9 which is pivotally mounted on pin 6.

The rearwardly extending follower portions of arms 1 and 3 rest on the respective faces 628*a* and 628*b* of a double faced cam 628 fast on a drive shaft 350 which rotates once with each cycle of the machine. A tension spring 11 attached to a lug provided on each of arms 1 and 3 urges said arms together so that their follower portions are maintained in engagement with the faces of cam 628, and their depending ears 1*a*, 3*a* firmly and drivingly embrace stud 7. Link 8 is pivotally attached at its forward end to the lower end of a rocker arm 627 pivoted at its mid-portion to the machine framing. The upper end of rocker arm 627 is pivotally secured to the forward end of multiplier counting finger 626.

Upon rotation of shaft 350 in either direction, i.e., positively or negatively, follower arms 1 and 3, acting upon stud 7, will cause oscillation of crank 9 and reciprocation of link 8 whereby rocker arm 627 will be rocked about its central pivotal mounting.

The rear end of a link 629 is pivotally attached to counting finger 626 below the pivot of said finger on rocker arm 627, and said link 629 is slidably supported in a bracket 630 mounted on the inner face of the right hand side frame. The top of a tightly wound spring 631 is attached to the forward end of link 629 and the bottom of the spring is mounted on a lever 632 to the left of the fulcrum of said lever on the inner face of the right hand side frame. Lever 632 is provided with a roller 633 at its forward end and a spring attached to the rearward end thereof biases it in a counterclockwise direction.

Normally upon operation of rocker arm 627, counting finger 626 is moved idly forward and back again in a straight line to the position shown in Fig. 1. During this action, the counting finger is urged downwardly by link 629 and rests upon a bushing 4' on shaft 4, and out of engagement with multiplier storage gear 540. Link 629 urges finger 626 downwardly as it is moved toward the front of the machine by spring 631, lever 632 being rocked counterclockwise by said spring attached to its rearward end.

When slide 593 is moved to the rear upon depression of the multiplier key, the rear end of said slide is moved beneath roller 633 of lever 632, thus blocking said lever from counterclockwise movement. Accordingly when rocker arm 627 is operated, link 629, being at first held from forward movement by spring 631, will effect movement of finger 626 counterclockwise about its pivot on rocker arm 627 until the rearward end of said finger is raised into contact with multiplier storage gears 540. As shown by the dotted lines in Fig. 1, the rearward free end of finger 626 is bent inwardly at a right angle to engage the teeth of gear 540. Further counterclockwise movement of the countering finger being prevented by gear 540, further movement of rocker arm 627 will move finger 626 toward the front of the machine against the tension of spring 631 thus rotating gear 540 clockwise one tooth. As rocker arm 627 is moved clockwise in its return movement, finger 626 will be moved toward the rear and will ratchet past the tooth to the rear since the rear face of the engaging portion is bevelled and the gear is restrained by a suitable pawl (not shown). As the cycle is completed and link 629 reaches the limit of its rearward travel, finger 626 is moved clockwise by said link to its normal position shown in Fig. 1.

It will be understood that when carriage 2 is in its extreme left-hand position, the rightmost storage gear 540 will be in position for engagement by counting finger 626, and that when carriage 2 is shifted to the right from order to order the respective gears 540 will be brought into position for cooperation with counting finger 626.

*Quotient entry*

From the foregoing descriptions of division and multiplication, it will be seen that should it be desired to employ a quotient as a multiplier, it would be necessary in the prior art machines after having operated the machine to obtain the quotient, to then insert the quotient into the machine as a multiplier. This would entail: (1) clearing the keyboard (while this is done automatically after division in the aforementioned Gang patents, many machines of this general type are not so provided); (2) reading the quotient from quotient dials 85; (3) setting the quotient on the keyboard; and (4) depressing the set-up key to enter the quotient into multiplier storage wheels 524 and gears 540. These steps are time-consuming and present an opportunity for human error. The operator may neglect to clear the keyboard, and may set an erroneous value on the keyboard.

The present invention avoids the four above-enumerated steps by providing a normally ineffective, unidirectional quotient counting finger 20 (Figs. 1, 3) which, when appropriately conditioned prior to a division operation, is rendered effective upon initiation of division to count the quotient digit into multiplier storage gears 540. Since, as indicated previously, the machine goes through two excess cycles in computing each quotient digit, a control member 30 is provided to render the quotient counting finger effective only after the machine has cycled twice in computing each digit. After computation of a quotient digit in any particular order, the carriage shifts one order to the left. In response to the shift, the quotient counting finger is rendered ineffective. Upon renewed cycling of the machine to compute the lower order quotient digit, the counting finger is again rendered effective to count into the multiplier storage gears 540 all computing cycles in excess of the first two. The same sequence of operations occurs as the machine shifts leftwardly from order to order in computing the quotient digits.

It should be noted at this point that it is not practical to employ multiplier counting finger 626 for quotient entry, as for example by making said finger bidirectionally operable. The calculating machine of the Gang patents, in addition to performing conventional plus multiplication, is also adapted to carry out minus multiplication wherein the machine registers negatively during multiplication. Regardless of the nature of a multiplication program, i.e., plus or minus, multiplier counting finger 626 must always function to count the multiplier out of storage gears 540 and must therefore always operate in the same direction to index said storage gears negatively.

Further, it is undesirable to employ a separate bi-directional quotient entry finger similar to fingers 412, which count in opposite directions in response to subtractive or additive registration. In this regard, the hub of each gear 540 is provided with a recess 542 adapted for cooperation with a finger 543, said finger entering the recess when the gear 540 is counted back to zero, and thereby controlling a program of multiplication. If a bi-directional quotient entry finger were employed, the calculation of a quotient digit of either zero or nine would cause storage gear 540 to be counted from and to zero, and to and from zero in the respective cases. In either event, finger 543 would of necessity leave and reenter (zero) or enter and leave (nine) recess 542, imposing undesirable stresses on the mechanism.

Figures 3, 4:
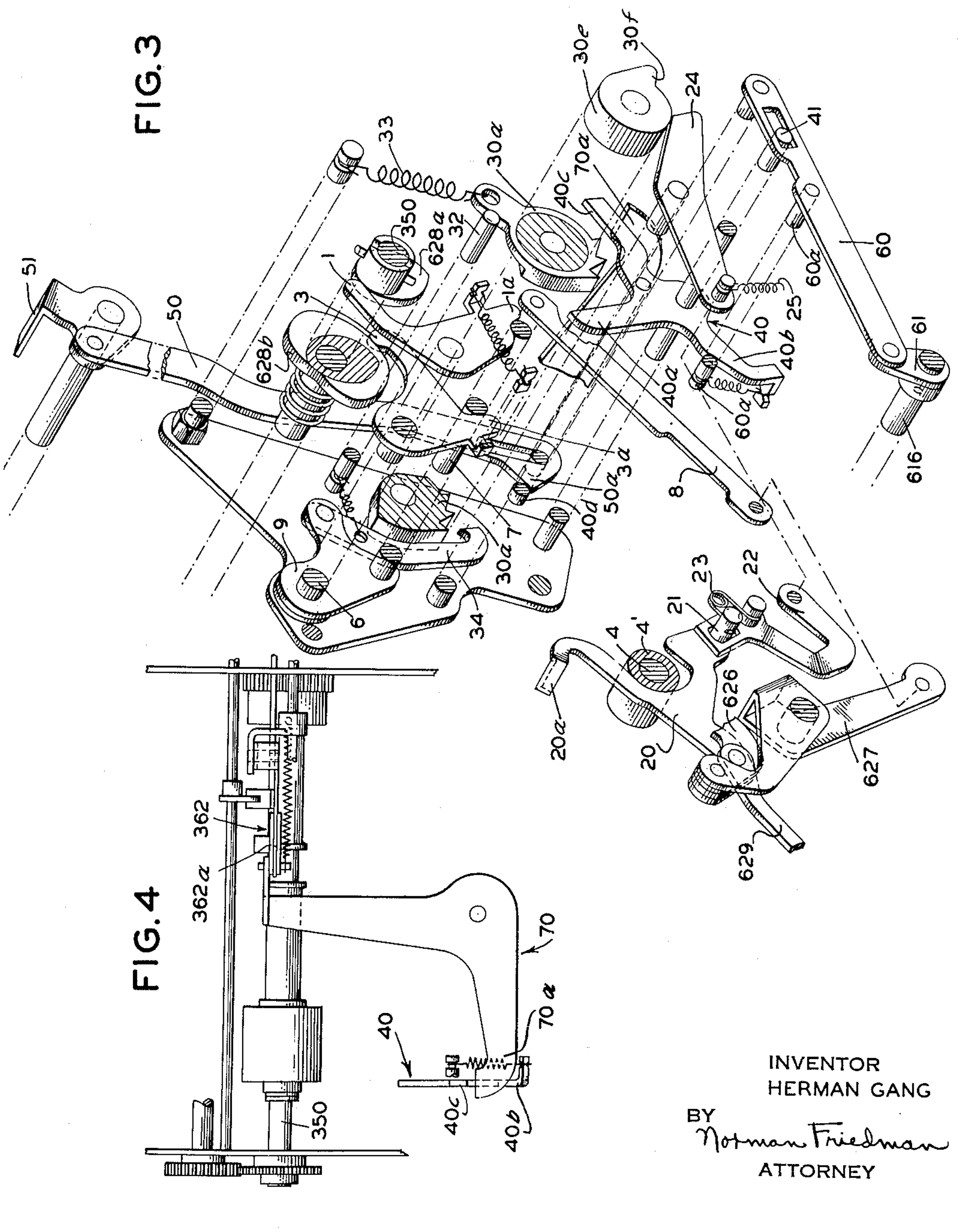
Fig. 3 is an exploded perspective view of the quotient entering mechanism.
Fig. 4 is a rear elevation showing the shift toggle employed to disable the quotient counting finger following calculation of each quotient digit.

Accordingly, a unidirectional quotient counting finger 20 is provided (Figs. 1, 3), driven by rocker arm 627 to which it is pivotally connected in common with the multiplier counting finger 626. Fingers 20 and 626 are movable independently of each other on their pivot with arm 627. Finger 20 is normally in ineffective position as shown in Figs. 1 and 3, and idly rides back and forth on bushing 4' of actuator shaft 4. A pin 21 provided on the lower part of finger 20 extends through a slot in the upper part of a link 22, spring 23 urging pin 21 to the upper limit of the slot. Link 22 is pivoted at its lower, rear portion to the front end of a lever 24 pivoted at its mid-portion to an auxiliary side frame of the machine. A tension spring 25 acting on the pivotal connection between link 22 and lever 24 biases said lever counterclockwise so that its rearwardly extending portion is urged against portion **30*e* of control member 30. Spring 25 further tends to maintain counting finger 20** in its lower, ineffective position.

Control member 30 (Figs. 1, 2, 3) is journalled for rotation on a pin 31 fixed in the machine framing, and is normally urged counterclockwise against a stop pin 32 by a spring 33. Control member 30 comprises two portions, namely a ratchet portion **30*a* having three longitudinally extending ratchet teeth 30*b*, 30*c*, 30*d*; and a cylindrical cam portion 30*e* provided with an outwardly extending cam ear 30*f***.

A pawl 34 is pivoted at its upper end to crank 9 and is spring biased counterclockwise so that its rear vertical edge surface rides on ratchet portion **30*a* of control member 30. It will be recalled that crank 9 is caused to oscillate, in response to rotation of shaft 350, by the action of follower arms 1, 3 on stud 7. This oscillation of crank 9 will cause pawl 34 to ride up and down on portion 30*a* of control member 30** with each cycle of the machine.

During the upward stroke of said pawl 34, its lower hook-like portion engages ratchet tooth **30*b* of control member 30 and moves the control member clockwise a given amount. On the subsequent downward stroke of pawl 34, control member 30 is returned to its original position under the urging of spring 33**.

A normally disabled check latch 40 is provided for cooperation with the teeth of ratchet portion **30*a* when it is desired to automatically enter a quotient into multiplier storage gears 540 and wheels 524. Check latch 40 is pivoted to the machine framing by a pin 41, and includes an upwardly extending latch arm 40*a*, a rearwardly extending arm 40*c*, and a forwardly extending portion 40*b*. Latch 40 is urged clockwise by a suitable spring but is normally blocked from such movement by engagement of its portion 40*b* with a pin 60*a* provided on a link 60. Further, a forwardly extending nose 50*a* on the lower end of a lever 50 lies closely adjacent to and in the path of a sidewardly extending pin 40*d* of latch 40. In order that latch 40 be rendered effective for cooperation with control member 30, lever 50 and its forwardly extending nose 50*a* must be moved downwardly thereby unblocking pin 40*d*. When the parts have been so conditioned, the subsequent intiation of a division operation will cause pin 60*a* to be moved forwardly, thereby freeing latch 40 for clockwise movement into engagement with control member 30**.

Lever 50 is pivoted at its upper end to the right-hand end of a bail 51 which is rotatably mounted in the framing and extends across the machine. Bail 51 is pivoted at its left-hand end to the rear of an elongated bar 52. Bar 52 extends to the front of the machine where it is pivotally attached to a suitable operating key 53, said key being pivoted at its bottom portion to the machine framing. Key 53 is movable clockwise (rearwardly) from its unoperated position shown in Fig. 1.

Lever 50 is pivoted at its lower end to the rear of link 60 by means of a slot and pin connection. Link 60 is formed with a slot through which pin 41 extends, said pin therefore guidingly supporting link 60. Said link is pivoted at its forward end to a crank 61 fast on shaft 616.

To condition latch 40 as discussed previously, key 53 is moved clockwise (rearwardly). Bar 52 will accordingly move rearwardly, rocking bail 51 counterclockwise and causing lever 50 to descend. Nose **50*a* of lever 50 is thereby moved downwardly, freeing pin 40*d* of latch 40**.

It will be recalled that when a program of division is initiated by depression of key 590 (Fig. 1), shaft 616 is rocked counterclockwise by spring 728. Crank 61, being fast on shaft 616, rocks in the same direction thereby moving link 60 and pin **60*a* forwardly away from portion 40*b* of latch 40. Latch 40, now being free for rotation, is spring-urged clockwise until arm 40*a* engages ratchet portion 30*a* of control member 30**.

As described previously, control member 30 is rotated clockwise from the position of Fig. 1 on each upward stroke of pawl 34. It should be noted that division having been initiated, the machine is now cycling subtractively to compute the quotient. The amount of clockwise rotation of member 30 is sufficient to permit latch arm **40*a*, now freed for clockwise rotation, to snap behind ratchet tooth 30*b* and thus prevent spring 33 from returning control member 30 counterclockwise when pawl 34 descends. The second ratchet tooth 30*c* is now in position to be engaged by pawl 34 on the next upward stroke of said pawl in the second subtractive cycle of the machine in computing the quotient digit. On said next (second) upward stroke of pawl 34, it engages second ratchet tooth 30*c* and rotates control member 30 a further amount clockwise. Member 30 is held in its position of further rotation by arm 40*a* of latch 40 which ratchets over the teeth of portion 30*a* as control member 30 is incrementally advanced. On the third subtractive cycle, pawl 34, by engagement with third ratchet tooth 30*d* will swing member 30 still further clockwise bringing nose 30*f* thereof into contact with lever 24 and thus rotating said lever clockwise. Link 22 is thereby elevated, raising quotient counting finger 20 into effective position for engagement of a leftwardly extending lug 20*a* thereof with the teeth of multiplier storage gear 540. Latch 40 will maintain control member 30 and therefore also finger 20** in this position until the carriage shifts to the next lower order.

The above-described enablement of finger 20 occurs during the first half of the third subtractive cycle in the computation of the quotient digit. During this half-cycle, rocker arm 627 will swing counterclockwise from the full cycle position shown in Fig. 1. On the return clockwise stroke of rocker arm 627, it will move quotient counting finger 20 rearwardly, thus indexing storage gear 540 one tooth counterclockwise, and accordingly moving storage wheel 524 clockwise one digit. On the next counterclockwise stroke of rocker arm 627, finger 20 will ratchet rearwardly past the next tooth of gear 540, since the gear is restrained by an appropriate pawl. All cycles employed in computing the quotient digit, other than the first two cycles, will thus be counted into storage gear 540 and storage wheel 524.

The calculation of the quotient digit in any order is followed by a leftward shift to the next lower order, whereupon the subtract, add, shift sequence is commenced in said lower order to compute the next quotient digit. Prior to subtractive cycling of the machine in said lower order, finger 20 must be returned to ineffective position and control member 30 returned to its normally ineffective position (Fig. 1) in order that said control member be able to render the finger effective to count into the multiplier storage gears only those cycles following the second cycle. The shift is employed to disable finger 20 and return control member 30 to normal position as follows.

As disclosed in detail in Patent No. 2,531,207, a carriage shift is initiated by breaking of a toggle 362 (Fig. 4). A bell crank 70 (Figs. 1, 4) rotatably mounted in the machine framing is pivoted to one of the arms **362*a* of toggle 362. When the toggle is broken, arm 362*a* moves to the right (Fig. 4) thus swinging bell crank 70 clockwise whereby a lower arm 70*a* of the bell crank moves upwardly. Rearwardly extending arm 40*c* of latch 40, which arm lies in the path of bell crank arm 70*a*, is engaged by said arm 70, swinging latch 40 counterclockwise (Fig. 1) thereby removing arm 40*a* of latch 40 from latching engagement with ratchet tooth 30*b*. Spring 33 now returns control member 30 counterclockwise to its normal position, removing cam ear 30*f* from engagement with lever 24 and thus permitting finger 20 to be brought to lower ineffective position by spring 25. As the machine commences subtractive registration in calculating the quotient digit, control member 30 operating in conjunction with pawl 34 and arm 40*a* of latch 40 will again render counting finger 20** effective after two subtractive cycles as described previously.

It will be understood that when carriage 2 is in its extreme right-hand position at the commencement of a division program, the leftmost storage gear 540 will be in position for engagement with quotient finger 20. As carriage 2 is shifted leftwardly from order to order in calculating the quotient, successive ones of the respective gears 540 will be brought into position.

Should division be performed without employing quotient entry into the multiplier storage gears 540, key 53 remains in the unoperated position of Fig. 1 and the forwardly extending nose **50*a* of arm 50 will, by engagement with pin 40*d* of latch 40, maintain said latch in ineffective position (Fig. 1) despite the fact that link 60 and pin 60*a*** are moved forwardly on initiation of division.

While the quotient entry mechanism has been disclosed specifically as embodied in the calculating machine of the Gang Patents 2,531,206 and 2,531,207, it will of course be understood that the present disclosure is not intended to be limitative of the scope of the invention but is for illustrative purposes only. The invention in its broad aspects can be applied in various ways and to other types of machines, as for example to a calculator in which a multiplier is entered by means of an auxiliary keyboard rather than through the main keyboard itself. It is therefore intended that the appended claims cover all modifications and equivalents as come within the spirit and scope of the invention as defined in said claims.

I claim:

1. In a calculating machine operable to perform division and positive and negative multiplication: cyclically operable registering mechanism operable to perform additive and subtractive operations, said registering mechanism operating additively in positive multiplication and subtractively in negative multiplication, said registering mechanism including reversely operable cyclic actuating means operating in one direction during additive operations and in the reverse direction during subtractive operations; an ordinal series of multiplier storage devices; counting means for counting a multiplier out of said multiplier storage devices, said counting means comprising a unidirectionally operable counting finger for counting a multiplier out of said storage devices during both additive and subtractive operation of said actuating means; a drive member reciprocally operable in time with said registering mechanism for operating said counting finger; means for automatically entering a quotient calculated during a division operation of said machine into said multiplier storage devices including a normally disabled counting finger reciprocally operable by said drive member for counting said quotient into said multiplier storage devices; means for selectively enabling said multiplier counting finger or said quotient counting finger; and means for initiating a multiplication calculation with said quotient standing in said multiplier storage devices to act as a multiplier in said multiplication calculation, said unidirectionally operable multiplier counting finger being operable during said multiplication calculation to count said quotient out of said multiplier storage devices regardless of the direction of operation of said actuating means.

2. The combination according to claim 1 wherein said multiplier counting finger and said quotient counting finger each comprises a lever member pivotally connected to said drive member.

References Cited in the file of this patent

UNITED STATES PATENTS

| | | |
|---|---|---|
| 1,207,700 | Baldwin | Dec. 12, 1916 |
| 2,136,694 | Laiho | Nov. 15, 1938 |
| 2,758,789 | Ellerbeck | Aug. 14, 1956 |
| 2,764,347 | Ellerbeck | Sept. 25, 1956 |
| 2,840,310 | Christoff | June 24, 1958 |

FOREIGN PATENTS

| | | |
|---|---|---|
| 1,085,783 | France | Aug. 4, 1954 |